United States Patent
Hatanaka (10) Patent No.: US 9,490,742 B2
(45) Date of Patent: Nov. 8, 2016

(54) MOTOR CONTROL APPARATUS

(71) Applicant: TOYOTA JIDOSHA KABUSHIKI KAISHA, Toyota-shi, Aichi-ken (JP)

(72) Inventor: Toshihiko Hatanaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/041,704

(22) Filed: Feb. 11, 2016

(65) Prior Publication Data

US 2016/0261222 A1    Sep. 8, 2016

(30) Foreign Application Priority Data

Mar. 3, 2015   (JP) .................................. 2015-041367

(51) Int. Cl.
  *H02P 6/16*     (2016.01)
  *H02P 29/02*    (2016.01)
  *H02P 27/06*    (2006.01)

(52) U.S. Cl.
  CPC .............. *H02P 29/024* (2013.01); *H02P 6/16* (2013.01); *H02P 6/28* (2016.02); *H02P 27/06* (2013.01)

(58) Field of Classification Search
  CPC ........... H02P 29/024; H02P 6/28; H02P 6/16
  USPC .................................................. 318/400.04
  See application file for complete search history.

(56) References Cited

U.S. PATENT DOCUMENTS

| 6,191,550 B1 | 2/2001 | Yoshihara |
| 6,389,373 B1 | 5/2002 | Ohya |
| 6,426,712 B1* | 7/2002 | Hare ...................... H03M 1/06 324/76.11 |
| 6,972,700 B2 | 12/2005 | Kanekawa et al. |
| 7,679,309 B2 | 3/2010 | Schulz et al. |
| 2005/0162292 A1* | 7/2005 | Kanekawa .............. B60T 8/885 341/111 |
| 2010/0295491 A1* | 11/2010 | Schulz ................. G01R 31/346 318/490 |
| 2016/0087561 A1* | 3/2016 | Rho ..................... H02P 29/0094 318/400.04 |

FOREIGN PATENT DOCUMENTS

| JP | H09-72758 A | 3/1997 |
| JP | 2000-074694 A | 3/2000 |

* cited by examiner

*Primary Examiner* — Erick Glass
(74) *Attorney, Agent, or Firm* — Oliff PLC (57) ABSTRACT

A motor control apparatus includes an A/D converter to apply A/D conversions to a motor current signal and a resolver output signal, respectively; a processor configured to: detect a fault of an R/D converter, by comparing a motor rotation angle calculated by the R/D converter from the resolver output signal, and a motor rotation angle calculated based on the current signal; permit the A/D converter to apply the A/D conversion to the resolver output signal at a peak timing of a reference signal when a first time obtained by subtracting a process time required for a control process of the motor from a feedback cycle, is longer than a second time having passed since a control end timing when the control process has ended until the peak timing, or inhibit the A/D converter from applying the A/D conversion when the first time is not longer than the second time.

2 Claims, 3 Drawing Sheets

MOTOR CONTROL APPARATUS

CROSS REFERENCE TO RELATED APPLICATION

The present application is based on and claims the benefit of priority of Japanese Priority Application No. 2015-041367, filed on Mar. 3, 2015, the entire contents of which are hereby incorporated by reference.

FIELD

The disclosures herein generally relate to a motor control apparatus that controls a motor rotating on AC (Alternating Current) power supplied following a switching command to an inverter, and detects a fault of an A/D (Analog-Digital) converter, based on a comparison result between a motor rotation angle based on a resolver position signal by an R/D (Resolver-Digital) converter, and a motor rotation angle calculated based on the resolver position signal after having an A/D conversion applied.

BACKGROUND

Conventionally, a motor control apparatus has been known that detects a fault of an R/D converter (for example, Japanese Laid-open Patent Publication No. 9-72758). The motor control apparatus includes a resolver. Based on a reference signal having a prescribed cyclic waveform, the resolver outputs a sine signal and a cosine signal depending on the rotation angle of the motor. The R/D converter calculates the rotation angle of the motor based on the sine signal and the cosine signal output by the resolver. An A/D converter applies A/D conversions to the sine signal and the cosine signal output by the resolver at a peak timing of the reference signal.

The motor control apparatus includes a control unit that receives as input a signal representing the rotation angle of the motor output by the R/D converter, and the sine signal and the cosine signal output by the A/D converter, after having the A/D conversions applied to the sine and cosine signals. The control unit compares the motor rotation angle based on the output of the R/D converter, with a motor rotation angle calculated based on the sine signal and the cosine signal after the A/D conversions based on the output of the A/D converter, to detect a fault of the R/D converter. If the difference between the motor rotation angles is not over a threshold, the control unit determines that the RID converter is in a normal state; and if the difference between the motor rotation angles is over the threshold, the control unit determines that the R/D converter is in a faulty state.

Incidentally, in a motor control apparatus, a motor control process is a feedback control process in which a switching command is issued to a switching element of an inverter, based on a difference between a command current to the motor, and a current actually flowing in the motor. To execute such feedback control, it is necessary to apply an A/D conversion to the current flowing in the motor by an A/D converter. Thereupon, one may consider using the same A/D converter for applying an A/D conversion to the motor current, and for applying an A/D conversion to a resolver output signal that is used for determining whether the R/D converter is normal or faulty. Configured in this way, the motor control apparatus does not need to have an A/D converter for motor current conversion, and a separate A/D converter far a resolver output conversion. Therefore, the circuit size can be reduced.

Also, to apply an A/D conversion to the motor current used in the motor control process, it is necessary to obtain the motor current at a timing in a feedback cycle synchronized with the rotational speed of the motor. On the other hand, to apply A/D conversions to the sine signal and the cosine signal output by the resolver, it is necessary to obtain these signals at a peak timing of a reference signal. However, if the timing to apply the A/D conversion to the resolver output signals (namely, the peak timing of the reference signal) overlaps with the timing to apply the A/D conversion to the motor current (namely, the control timing following the feedback cycle of the motor control process), then, the motor control process based on data after the A/D conversion may not be executed appropriately, or an erroneous determination may be obtained by a fault detection process of the R/D converter.

In view of the above, it is a general object of at least one embodiment to provide a motor control apparatus that can apply A/D conversions to the resolver output signals and the motor current, respectively, by a common A/D converter while executing the motor control process appropriately, and avoiding an erroneous determination of a fault of the R/D converter.

SUMMARY

According to an embodiment, a motor control apparatus includes a reference signal generation circuit configured to generate a reference signal having a prescribed cyclic waveform; a resolver configured to output a position signal depending on a rotation angle of a motor rotating due to AC power supplied following a switching command for an inverter, based on the reference signal; an R/D converter configured to calculate the rotation angle of the motor, based on the position signal output by the resolver; an A/D converter configured to apply an A/D conversion to a current signal flowing in the motor during a feedback cycle, the current signal varying depending on the rotational speed of the motor, and to apply an A/D conversion to the position signal at a peak timing when a peak of the reference signal is obtained; and a processor configured to (i) calculate a command value to control the motor, and calculate the feedback cycle, based on the current signal to which the A/D conversion has been applied and the rotation angle of the motor calculated by the R/D converter; (ii) detect a fault of the R/D converter, based on a comparison between the rotation angle of the motor calculated by the R/D converter, and the rotation angle of the motor calculated based on the position signal to which the A/D conversion has been applied; and (iii) permit the A/D converter to apply the A/D conversion to the position signal at the peak timing when (a) a first time obtained by subtracting (a1) a process time required for a control process of the motor from (a2) the feedback cycle, is longer than (b) a second time having passed between (b1) a control end timing when the control process has ended and (b2) the peak timing; or inhibit the A/D converter from applying the A/D conversion to the position signal at the peak timing when the first time is not longer than the second time.

DESCRIPTION OF EMBODIMENT

In the following, a motor control apparatus 10 will be described according to one embodiment with reference to the drawings.

Figure 1:
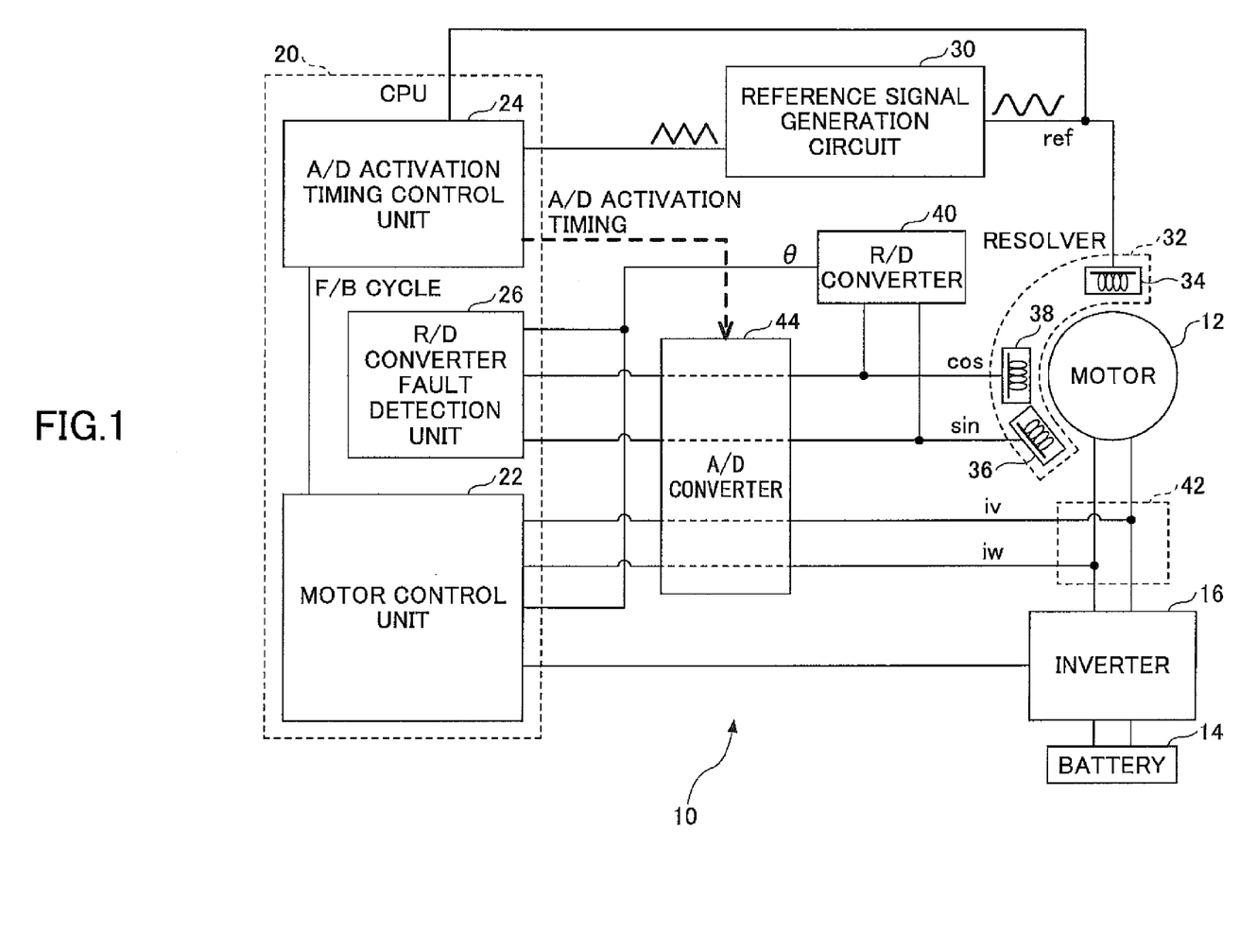
FIG. 1 is a configuration diagram of a motor control apparatus according to an embodiment.

FIG. 1 illustrates a configuration diagram of the motor control apparatus 10 according to one embodiment. In the embodiment, the motor control apparatus 10 is an apparatus that controls driving an electric motor 12 (simply referred to as a "motor" below), for example, a motor for driving an electric vehicle or a hybrid vehicle, or an assist motor used for an electric power steering apparatus.

The motor control apparatus 10 includes the motor 12, a battery 14, and an inverter 16. The motor 12 is, for example, a three-phase, synchronous AC motor, and is configured to have respective first terminals of coils of three phases, namely, U-phase, V-phase, and W-phase, commonly connected with a neutral point. The motor 12 is connected with the battery 14 via the inverter 16. The battery 14 is, for example, a secondary battery such as a lithium-ion battery or a nickel-hydrogen battery, and capable of outputting a prescribed voltage (for example, 240 V).

The inverter 16 includes upper and lower arm elements for the three phases of the motor 12, respectively. The upper arm element and the lower arm element are connected in series with each other in each of the phases, between the positive and negative terminals of the battery 14. The upper and lower arm elements in each of the phases have a structure in which a switching element, for example, an insulation gate-type bipolar transistor (IGBT) or an electric field effect transistor (power MOSFET) and a diode are connected in parallel. A midpoint between the upper arm element and the lower arm element in each of the phases is connected with a second terminal of the coil of the phase of the motor 12.

The switching elements of the upper and lower arm elements of the inverter 16 are turned on and off by drive commands from the motor control apparatus 10, respectively. Having the switching elements of the upper and lower arm elements turned on and off alternately, the inverter 16 converts DC (Direct Current) power of the battery 14 into AC power, to supply it to the phases of the motor 12. Having the power supplied from the battery 14 via the inverter 16, the motor 12 is driven to rotate.

Note that a boost converter may be provided between the battery 14 and the inverter 16, to boost the DC voltage of the battery 14 by having a pair of switching elements turned on and off, using the energy accumulation effect of a reactor. Also, the motor 12 may be a motor generator capable of generating power by rotation of the motor 12.

The motor control apparatus 10 is mainly configured with a microcomputer to control driving of the motor 12, namely the inverter 16, by a CPU 20 executing a software program stored in advance, and hardware implemented by an electronic circuit. The CPU 20 includes a motor control unit 22, an A/D activation timing control unit 24, and an R/D converter fault detection unit 26. The motor control unit 22 is a part that controls driving the motor 12, namely, the inverter 16. The A/D activation timing control unit 24 is a part that controls an activation timing of an analog-digital conversion (A/D conversion) performed by an A/D converter, which will be described later. The R/D converter fault detection unit 26 is a part that detects a fault of an R/D converter, which will be described later.

The motor control apparatus 10 includes a reference signal generation circuit 30 and a resolver 32. The reference signal generation circuit 30 is a circuit to generate a reference signal "ref" having a prescribed cyclic waveform. The waveform of the reference signal "ref" changes cyclically while time passes. Specifically, the waveform is a sine wave represented by $A \cdot \sin \omega t$ where A is an amplitude, $\omega$ is an angular frequency, and t is time.

The reference signal generation circuit 30 is connected with the resolver 32. The sinusoidal reference signal "ref" generated by the reference signal generation circuit 30 is supplied to the resolver 32. Note that a peak of the reference signal "ref" appears every prescribed cycle Tref (for example, 100 ns), and the frequency of the reference signal "ref" is, for example, 10 MHz.

The resolver 32 is a sensor to detect a mechanical rotation position (rotation angle $\theta$) of a rotor included in the motor 12. The resolver 32 includes an excitation winding 34, a sine winding 36, and a cosine winding 38. The sine winding 36 and the cosine winding 38 are disposed so that if the reference signal "ref" supplied to the excitation winding 34 has the waveform represented by $A \cdot \sin \omega t$, a sine signal represented by $K \cdot A \cdot \sin \omega t \cdot \sin \theta$, and a cosine signal represented by $K \cdot A \cdot \sin \omega t \cdot \cos \theta$ are obtained by windings 36 and 38, where K is an amplitude coefficient. Based on the reference signal "ref", the resolver 32 outputs the sine signal and the cosine signal as position signals depending on the rotation angle $\theta$ of the rotor of the motor 12.

The motor control apparatus 10 includes an R/D converter 40, a current sensor 42, and an A/D converter 44. The resolver 32 is connected with the R/D converter 40. The sine signal and the cosine signal output by the resolver 32 are supplied to the R/D converter 40. The R/D converter 40 functions to convert the resolver signals into a digital signal, and based on the sine signal and the cosine signal from the resolver 32, calculates a rotation angle $\theta$ of the rotor of the motor 12.

On a power line between the motor 12 and the inverter 16, a current sensor 42 is provided. The current sensor 42 is a sensor that outputs signals corresponding to motor currents iv and iw flowing in coils of the respective two phases (referred to as "V-phase" and "W-phase" below) of the motor 12. Note that at a particular moment, the sum of values of real currents Iu, Iv, and Iw of the respective three phases is zero. Therefore, the current sensor 42 may output signals corresponding to coil currents of two phases, and obtain the current of the remaining one phase by calculation; or may output signals corresponding to the motor currents iu, iv, and iw of all three phases.

The resolver 32 and the current sensor 42 are connected with the A/D converter 44. The sine signal and the cosine signal output by the resolver 32, and the motor current signals iv and iw output by the current sensor 42 are input into the A/D converter 44. The A/D converter 44 functions to apply A/D conversions to the sine signal and the cosine signal from the resolver 32, to convert respective analog values into digital values, and functions to apply A/D conversions to the motor current signals iv and iw from the current sensor 42, to convert respective analog values into digital values.

The R/D converter 40 and the A/D converter 44 are connected with the motor control unit 22. A digital value of the rotation angle A of the rotor of the motor 12 calculated by the R/D converter 40, and digital values of the motor current signals iv and iw having A/D conversions applied by the A/D converter 44, are supplied to the motor control unit 22. Based on the obtained motor current signals iv and iw and the motor rotation angle θ, the motor control unit 22 calculates a switching command value for the switching element of the inverter 16 that is required to control driving the motor 12, and controls driving the motor 12 that executes the switching command following the switching command value.

Also, based on the obtained motor current signals iv and iw and the motor rotation angle θ, the motor control unit 22 calculates a feedback cycle Tf_i as a timing to obtain the motor current signals iv and iw for the next time, to control driving the motor 12. This feedback cycle Tf_i changes depending on the rotational speed (namely, revolutions per unit time) of the motor 12, so as to be shorter while the rotational speed of the motor 12 is greater, and so as to be longer while the rotational speed of the motor 12 is less.

The motor control unit 22 and the A/D activation timing control unit 24 are connected with each other. The feedback cycle Tf_i calculated by the motor control unit 22 is supplied to the A/D activation timing control unit 24. Following the feedback cycle Tf_i from the motor control unit 22, the A/D activation timing control unit 24 calculates a timing to obtain the motor current signals iv and iw for the next time.

Then, at the timing following the feedback cycle Tf_i calculated as above, the A/D activation timing control unit 24 executes activation timing control to have the A/D converter 44 apply A/D conversions to the motor current signals iv and iw from the current sensor 42. Specifically, at the timing following the feedback cycle Tf_i, the A/D activation timing control unit 24 issues a command to the A/D converter 44 to apply A/D conversions to the motor current signals iv and iw from the current sensor 42. In this case, the A/D converter 44 applies the A/D conversions to the motor current signals iv and iw from the current sensor 42 following the A/D activation timing from the A/D activation timing control unit 24.

The reference signal generation circuit 30 is connected with the A/D activation timing control unit 24 of the CPU 20. A source signal of the reference signal "ref" generated by the reference signal generation circuit 30 (for example, a triangular wave) is supplied to the A/D activation timing control unit 24. Based on the source signal from the reference signal generation circuit 30, the A/D activation timing control unit 24 calculates a peak timing at which a maximal value (a peak) of the reference signal "ref" is supplied to the resolver 32. Also, the A/D activation timing control unit 24 calculates a time Tr_i having passed since the peak timing of the reference signal "ref" by using a reference peak timer (note that a remaining time until the next peak timing may be used) where i represents the number of times the motor control process has been executed. The reference peak timer is incremented within a fixed cycle, and cleared at the next peak timing of the reference signal "ref".

At a timing when the time Tr_i calculated as described above coincides with the prescribed cycle Tref of the reference signal "ref" (a peak timing), the A/D activation timing control unit 24 executes the activation timing control to have the A/D converter 44 apply A/D conversions to the sine signal and the cosine signal from the resolver 32. Specifically, at the peak timing, the A/D activation timing control unit 24 issues a command to the A/D converter 44 to apply the A/D conversions to the sine signal and the cosine signal from the resolver 32. In this case, following the A/D activation timing from the A/D activation timing control unit 24, the A/D converter 44 applies the A/D conversions to the sine signal and the cosine signal from the resolver 32.

Based on the peak timing of the reference signal "ref" calculated as described above, and the feedback cycle Tf_i from the motor control unit 22, the A/D activation timing control unit 24 also executes a determination process to determine whether to permit or inhibit the A/D conversions to be applied to the sine signal and the cosine signal from the resolver 32 by the A/D converter 44 at the peak timing. This determination process is executed after the motor control unit 22 has controlled driving the motor 12, and has calculated the feedback cycle Tf_i as the timing to obtain the motor current signals iv and iw for the next time. Note that the timing of this determination process is not limited to the timing after the motor control unit 22 has controlled driving the motor 12, and has calculated the feedback cycle Tf_i as the timing to obtain the motor current signals iv and iw for the next time, but may be executed at another timing.

As the determination process, the A/D activation timing control unit 24 first determines whether the peak timing overlaps with a timing of the motor control process following the feedback cycle Tf_i (for example, about several hundred is, namely, a frequency of several kHz) for the next time. Then, based on the determination result, the A/D activation timing control unit 24 permits or inhibits the A/D conversions to be applied to the sine signal and the cosine signal from the resolver 32 by the A/D converter 44 at the peak timing of the reference signal "ref".

Note that if permitting the A/D conversions, the A/D activation timing control unit 24 issues a command to the A/D converter 44 to apply the A/D conversions to the sine signal and the cosine signal from the resolver 32 at the peak timing as usual. On the other hand, if inhibiting the A/D conversion, the A/D activation timing control unit 24 does not issue the command.

Also, the R/D converter 40 and the A/D converter 44 are connected with the R/D converter fault detection unit 26. The digital value of the rotation angle θ of the rotor of the motor 12 calculated by the RID converter 40, and the digital values of the sine signal and the cosine signal from the resolver 32 having the A/D conversions applied by the A/D converter 44 are supplied to the R/D converter fault detection unit 26.

Based on the sine signal and the cosine signal from the resolver 32 obtained from the A/D converter 44 and the motor rotation angle θ obtained from the R/D converter 40, the R/D converter fault detection unit 26 detects whether there is a fault of the R/D converter 40. Specifically, the R/D converter fault detection unit 26 compares an estimated value of the motor rotation angle θ estimated based on the sine signal and the cosine signal from the resolver 32, with the motor rotation angle θ from the R/D converter 40. Then, if a difference between these two angles is less than a prescribed value, the R/D converter fault detection unit 26 determines that the R/D converter 40 is in a normal state; on the other hand, if the difference between these two angles is greater than or equal to the prescribed value, the R/D converter fault detection unit 26 determines that the R/D converter 40 is in a faulty state.

Figure 2:
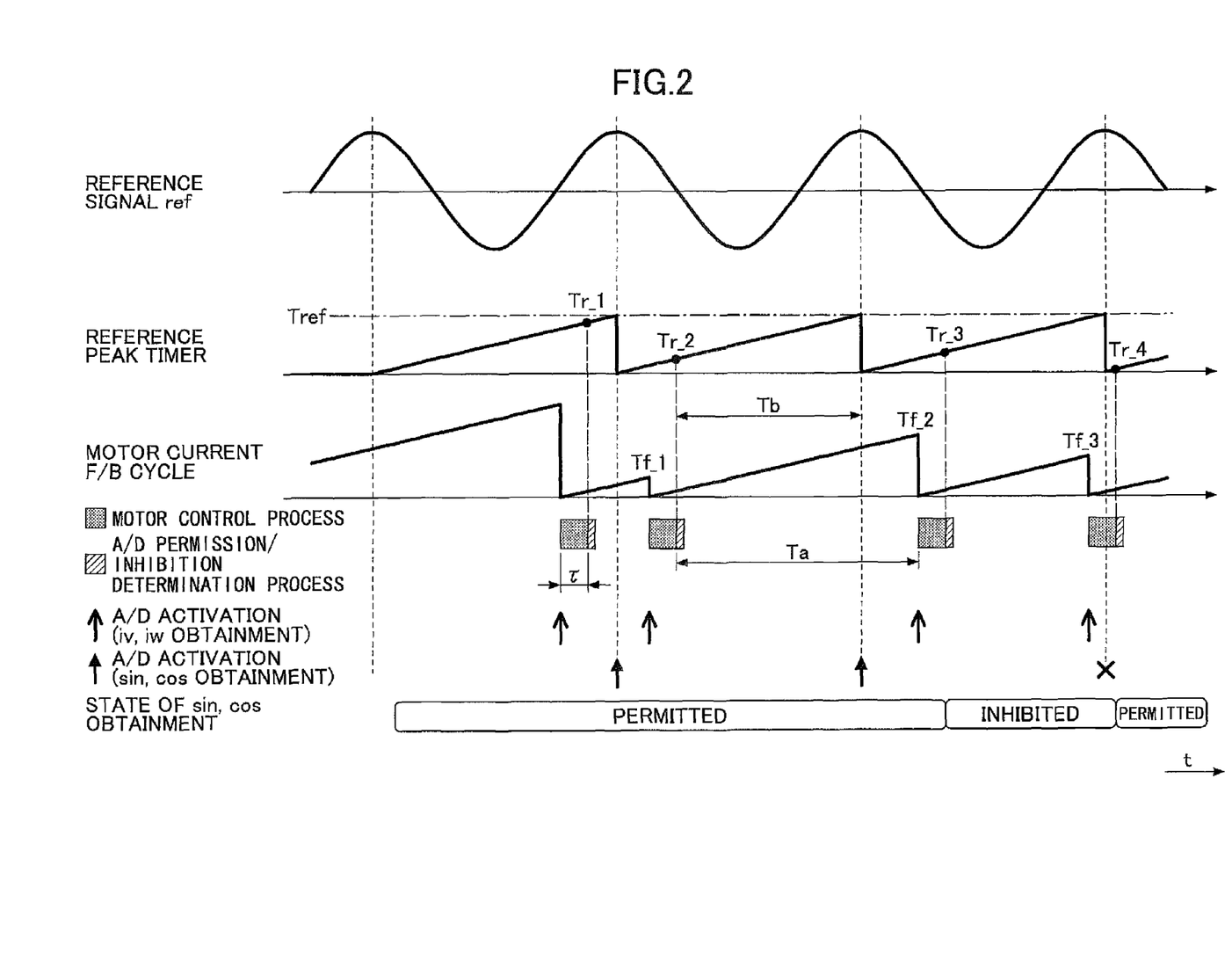
FIG. 2 is an example of a control timing chart implemented in the motor control apparatus according to the embodiment.
Figure 3:
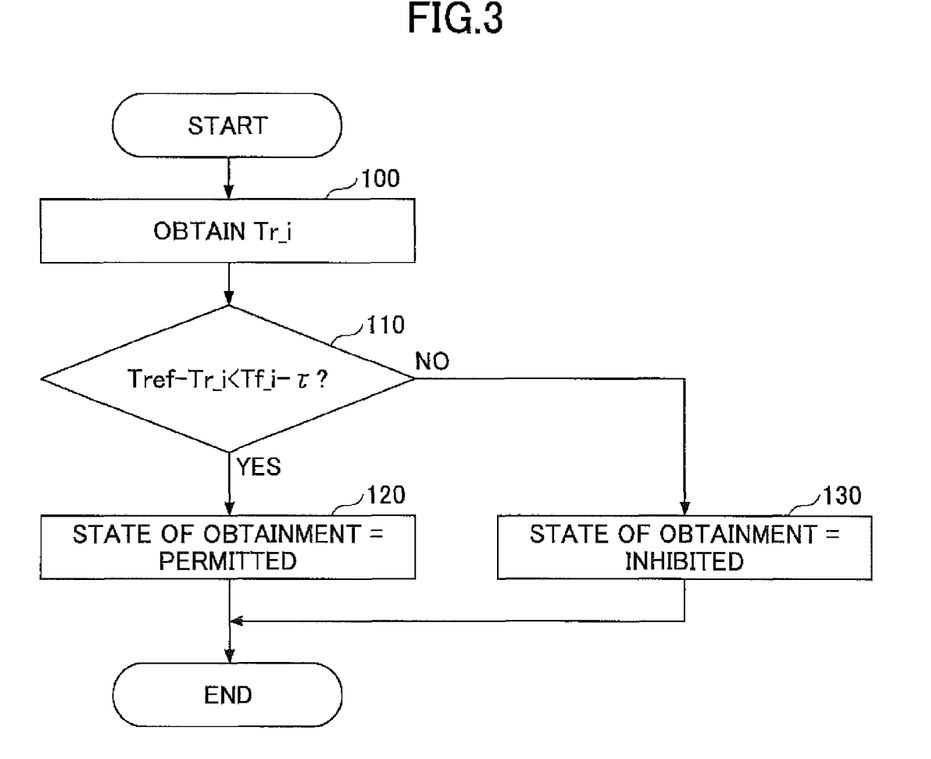
FIG. 3 is an example of a flowchart of a control routine executed in the motor control apparatus according to the embodiment.

Next, with reference to FIG. 2 and FIG. 3, operations of the motor control apparatus 10 will be described according to the embodiment. FIG. 2 illustrates an example of a control timing chart implemented in the motor control apparatus 10 according to the embodiment. Also, FIG. 3 illustrates an example of a flowchart of a control routine executed by the A/D activation timing control unit 24 of the CPU 20 in the motor control apparatus 10 according to the embodiment.

In the embodiment, the sinusoidal reference signal "ref" generated by the reference signal generation circuit 30 is supplied to the excitation winding 34 of the resolver 32. Based on the reference signal "ref", the resolver 32 outputs the sine signal and the cosine signal depending on the rotation angle θ of the rotor of the motor 12. The sine signal and the cosine signal are supplied to the R/D converter 40. Based on the sine signal and the cosine signal from the resolver 32, the R/D converter 40 calculates the rotation angle θ of the rotor of the motor 12.

Information about the rotation angle θ of the motor 12 calculated by the R/D converter 40 is supplied to the motor control unit 22 of the CPU 20. Also, the motor current signals iv and iw output by the current sensor 42 are supplied to the motor control unit 22 after having A/D conversions applied to them by the A/D converter 44. Based on the obtained motor current signals iv and iw and the motor rotation angle θ, the motor control unit 22 calculates a switching command value for each of the switching elements of the inverter 16 to control driving the motor 12 to execute the switching command following the switching command value, and calculates a feedback cycle Tf_i as a timing to obtain the motor current signals iv and iw for the next time to control driving the motor 12.

After the switching command has been executed, the switching elements of the phases of the inverter 16 are driven to be switched, which controls the motor 12 to be driven. This motor control process is executed by the motor control unit 22 at the timing following the feedback cycle Tf_i obtained by calculation at the previous time. This process makes it possible to control driving the motor 12 appropriately. Note that the time to be taken by execution of the motor control process by the motor control unit 22 is virtually a constant time τ.

Also, in the embodiment, the source signal of the reference signal "ref" generated by the reference signal generation circuit 30 (for example, a triangular wave) is supplied to the A/D activation timing control unit 24 of the CPU 20. Also, the signal representing the feedback cycle Tf_i calculated by the motor control unit 22 is supplied to the A/D activation timing control unit 24 of the CPU 20. Based on the obtained source signal of the reference signal "ref" and the feedback cycle Tf_i, the A/D activation timing control unit 24 controls an activation timing to apply the A/D conversions to the motor current signals iv and iw from the current sensor 42 by the A/D converter 44, and controls an activation timing to apply the A/D conversions to the sine signal and the cosine signal from the resolver 32 by the A/D converter 44.

Specifically, to control an activation timing to apply the A/D conversions to the motor current signals iv and iw from the current sensor 42 by the A/D converter 44, the A/D activation timing control unit 24 calculates a timing to obtain the motor current signals iv and iw for the next time, following the feedback cycle Tf_i supplied from the motor control unit 22, and at that timing, has the A/D converter 44 execute a process to apply the A/D conversions to the motor current signals iv and iw from the current sensor 42 (the A/D conversion process for motor control).

Also, to control the activation timing to apply the A/D conversions to the sine signal and the cosine signal from the resolver 32 by the A/D converter 44, the A/D activation timing control unit 24 first calculates a peak timing at which a peak of the reference signal "ref" is obtained based on the source signal of the reference signal "ref" supplied from the reference signal generation circuit 30. Then, the A/D activation timing control unit 24 calculates a time Tr_i having passed since the peak timing of the reference signal "ref" by using the reference peak timer (Step 100). Note that the A/D activation timing control unit 24 clears the time Tr_i calculated by the reference peak timer when the peak timing of the reference signal "ref" is obtained.

A signal representing the feedback cycle Tf_i is supplied from the motor control unit 22 to the A/D activation timing control unit 24 every time just after the feedback cycle Tf_i has been calculated by the motor control unit 22. Just after having obtained the feedback cycle Tf_i supplied from the motor control unit 22, the A/D activation timing control unit 24 obtains the time Tr_i calculated by the reference peak timer. Then, based on the obtained time Tr_i and the prescribed cycle Tref of the reference signal "ref", the A/D activation timing control unit 24 calculates a peak timing at which a peak of the reference signal "ref" is obtained for the next time (namely, a timing at which the A/D conversions should be applied to the sine signal and the cosine signal from the resolver 32).

Then, the A/D activation timing control unit 24 executes a process to have the A/D converter 44 apply the A/D conversions to the sine signal and the cosine signal from the resolver 32 (the A/D conversion process for fault detection) at a timing when time has passed since the time Tr_i has been obtained as described above until the next peak timing of the reference signal "ref" (namely, a timing when the time Tr_i calculated as described above coincides with the prescribed cycle Tref of the reference signal "ref" (the next peak timing)).

In the following, a case will be described in which the motor control apparatus 10 in the embodiment inhibits the A/D conversion process for fault detection by the A/D converter 44.

In the embodiment, the A/D activation timing control unit 24 executes a process to permit or inhibit A/D conversions to be applied to the sine signal and the cosine signal from the resolver 32 at the next peak timing of the reference signal "ref" (A/D permission/inhibition determination process).

Specifically, as the A/D permission/inhibition determination process, just after having obtained the feedback cycle Tf_i supplied from the motor control unit 22 (Step 100), the A/D activation timing control unit 24 first compares the next peak timing of the reference signal "ref" with the feedback cycle Tf_i. Then, the A/D activation timing control unit 24 determines whether the next peak timing of the reference signal "ref" overlaps with a timing to execute the motor control process for the next time (Step 110).

Specifically, at Step 110, the execution process time τ is first calculated which is the time to be taken by execution of the motor control process. Note that this execution process time τ may be defined and stored in advance. Then, a first time Ta (=Tf_i−τ) is calculated by subtracting the execution process time τ from the feedback cycle Tf_i supplied from the motor control unit 22. Also, a second time Tb (=Tref−Tr_i) is calculated that is time passed since the end timing of the motor control process until a peak timing of the next peak of the reference signal "ref" is obtained. Then, the first time Ta is compared with the second time Tb, to determine whether the first time Ta is longer than the second time Tb.

Note that depending on a relationship between the cycle Tref of the reference signal "ref" and the feedback cycle Tf_i, there may be a case where multiple peak timings of the reference signal "ref" exist between the end of a motor control process and the end of the next motor control process. In this case, at Step 110, the second time Tb may be calculated for each of the peak timings of the reference signal "ref" until the end of the next motor control process, to compare the first time Ta with the second times Tb, respectively, for determining whether the first time Ta is longer than the second times Tb.

As a result of Step 110, if determining that the first time Ta is longer than the second time Tb, and determining that the next peak timing of the reference signal "ref" does not overlap with the control timing to execute the motor control process for the next time (Yes in Step 110), the A/D activation timing control unit 24 permits obtaining the sine signal and the cosine signal from the resolver 32 at the next peak timing of the reference signal "ref" (Step 120). Note that this permission to obtain the sine signal and the cosine signal is continued until at least the end of the motor control process for the next time, namely, a determination is obtained by the A/D permission/inhibition determination process for the next time.

As described above, if obtainment of the sine signal and the cosine signal is permitted, a command is issued as usual to request the A/D converter 44 to apply the A/D conversions to the sine signal and the cosine signal from the resolver 32 at the peak timing. Also, while the obtainment of the sine signal and the cosine signal is being permitted, at a timing of the motor control process, the command is issued from the A/D activation timing control unit 24 to request the A/D converter 44 to apply the A/D conversions to the motor current signals iv and iw from the current sensor 42.

Therefore, configured in this way, while the obtainment of the sine signal and the cosine signal is being permitted, at a peak timing of the reference signal "ref", it is possible to have the A/D converter 44 apply the A/D conversions to the sine signal and the cosine signal from the resolver 32. Also, at a timing of the motor control process for the next time, it is possible to have the A/D converter 44 apply the A/D conversions to the motor current signals iv and iw from the current sensor 42.

The sine signal and the cosine signal from the resolver 32 having the A/D conversions applied by the A/D converter 44 at the peak timing of the reference signal "ref" following the command from the A/D activation timing control unit 24, are then supplied to the R/D converter fault detection unit 26 of the CPU 20. Also, information about the rotation angle θ of the motor 12 calculated by the R/D converter 40 is supplied to the motor control unit 22 and to the R/D converter fault detection unit 26 of the CPU 20. Based on the sine signal and the cosine signal from the resolver 32 obtained from the A/D converter 44 and the motor rotation angle θ obtained from the R/D converter 40, the R/D converter fault detection unit 26 detects whether there is a fault of the R/D converter 40 as described above.

Therefore, if obtainment of the sine signal and the cosine signal is permitted at the peak timing of the reference signal "ref", and the A/D converter 44 is permitted to apply the A/D conversions to the sine signal and the cosine signal, based on data from the resolver 32 obtained at the peak timing of the reference signal "ref", it is possible to detect whether there is a fault of the R/D converter 40.

Also, as a result of Step 110, if determining that the first time Ta described above is not longer than the second time Tb described above, and determining that the next peak timing of the reference signal "ref" overlaps with the control timing to execute the motor control process for the next time (No in Step 110), the A/D activation timing control unit 24 inhibits the obtainment of the sine signal and the cosine signal from the resolver 32 at the next peak timing of the reference signal "ref" (Step 130). Note that this inhibition of the obtainment of the sine signal and the cosine signal is continued until at least the end of the motor control process for the next time, namely, a determination is obtained by the A/D permission/inhibition determination process for the next time.

In more detail, the determining whether the first time Ta is longer than the second time Tb at Step 110 may give a negative determination if the first time Ta is not longer than the second time Tb, and the first time Ta is within a prescribed range from the second time Tb (specifically, within the execution process time i required for the motor control process).

As described above, if obtainment of the sine signal and the cosine signal is inhibited, a command is not supplied to request the A/D converter 44 to apply the A/D conversions to the sine signal and the cosine signal from the resolver 32 at a peak timing that may appear until the end of the motor control process for the next time. Note that if a peak timing does not appear until the end of the motor control process for the next time, a command is not supplied to request the A/D converter 44 to apply the A/D conversions to the sine signal and the cosine signal from the resolver 32, naturally. Also, while the obtainment of the sine signal and the cosine signal is being inhibited, at a timing of the motor control process, a command is issued from the A/D activation timing control unit 24 to request the A/D converter 44 to apply the A/D conversions to the motor current signals iv and iw from the current sensor 42.

Therefore, configured in this way, while the obtainment of the sine signal and the cosine signal is being inhibited, at a peak timing of the reference signal "ref", it still is possible to have the A/D converter 44 apply the A/D conversions to the motor current signals iv and iw from the current sensor 42. Similarly, if the peak timing of the reference signal "ref" overlaps with the control timing to execute the motor control process, it is possible to have the A/D converter 44 apply the A/D conversions to the motor current signals iv and iw from the current sensor 42, while obtainment of the sine signal and the cosine signal is being inhibited.

If not having the A/D converter 44 apply the A/D conversions to the sine signal and the cosine signal from the resolver 32 at the peak timing of the reference signal "ref" (because obtainment of the sine and cosine signals is inhibited), it is not possible to have the R/D converter fault detection unit 26 detect whether there is a fault of the R/D converter 40. Therefore, if the obtainment of the sine signal and the cosine signal is inhibited at the peak timing of the reference signal "ref" (namely, the A/D conversions to be applied to the sine signal and the cosine signal by the A/D converter 44 are inhibited), fault detection in the R/D converter 40 is not executed based on data from the resolver 32 obtained at the peak timing of the reference signal "ref".

Note that a cycle necessary to execute detecting whether there is a fault of the R/D converter 40 is sufficiently longer than the cycle Tr of the reference signal "ref" and the feedback cycle Tf_i. Therefore, if the peak timing of the reference signal "ref" overlaps with the control timing to execute the motor control process for the next time, and consequently, if the A/D conversions are not applied to the sine signal and the cosine signal from the resolver 32 at the peak timing of the reference signal "ref", and fault detection in the R/D converter 40 is not executed based on data from the resolver 32 obtained at the peak timing of the reference signal "ref", it may not be a problem in terms of detecting whether there is a fault of the R/D converter 40.

Also, if multiple peak timings of the reference signal "ref" exist between the end of a motor control process and the end of the next motor control process, obtainment of the sine signal and the cosine signal from the resolver 32 may be permitted or inhibited as follows. Specifically, obtainment of the sine signal and the cosine signal from the resolver 32 may be permitted at all peak timings of the reference signal "ref" that exist between the end of a motor control process and the start of the next motor control process; on the other hand, obtainment of the sine signal and the cosine signal from the resolver 32 may be inhibited at a peak timing that overlaps with the control timing of the motor control process for the next time.

If obtainment of the sine signal and the cosine signal from the resolver 32 is permitted at a peak timing peak, the A/D conversions are applied to the sine signal and the cosine signal, to detect whether there is a fault of the RID converter 40. On the other hand, if obtainment of the sine signal and the cosine signal from the resolver 32 is inhibited at a peak timing peak, the A/D conversions are not applied to the sine signal and the cosine signal, not to detect whether there is a fault of the R/D converter 40.

Therefore, configured in this way, while opportunities to detect whether there is a fault of the R/D converter 40 based on data from the resolver 32 at the peak timing of the reference signal "ref", are secured as often as possible, fault detection in the R/D converter 40 can be inhibited at a peak timing that overlaps with the control timing of the motor control process for the next time.

In this way, the motor control apparatus 10 in the embodiment can apply A/D conversions to the motor currents iv and iw from the current sensor 42 following a feedback cycle Tf_i of the motor control process, and A/D conversions to the sine signal and the cosine signal from the resolver 32 at a peak timing of the reference signal "ref", by using the common A/D converter 44. Also, the motor control apparatus 10 can execute these two types of A/D conversion processes at separate timings without having the conversion timings overlapped with each other.

Configured in this way, the A/D converter 44 applying A/D conversions to the motor currents iv and iw from the current sensor 42 for the motor control process also can be used as the A/D converter 44 applying A/D conversions to the sine signal and the cosine signal from the resolver 32 for the fault detection process in the R/D converter 40. Therefore, the motor control apparatus 10 does not need to have separate A/D converters for the respective A/D conversions. Consequently, the circuit size can be reduced, and the cost can be reduced.

Also, by executing the A/D conversions for the motor control, and the A/D conversions for the fault detection at separate timings without having the conversion timings overlapped with each other, the following effects can be obtained. Specifically, it is possible to prevent the motor control process from failing due to timing overlap between the two types of A/D conversions by the single common A/D converter 44. Also, it is possible to avoid an erroneous determination of a fault of the R/D converter due to the timing overlap.

Therefore, according to the motor control apparatus 10 in the embodiment, it is possible to execute the A/D conversions for the motor control, and the A/D conversions for fault detection at the peak timing of the reference signal "ref", by using the common A/D converter 44. Also, it is possible to execute the motor control process accompanying the A/D conversion process for motor control appropriately, and to avoid an erroneous determination of a fault of the R/D converter accompanying the A/D conversion for fault detection.

Incidentally, in the embodiment, the motor control unit 22 corresponds to a "motor control unit" described in the claims; the R/D converter fault detection unit 26 corresponds to a "fault detection unit" described in the claims; the A/D activation timing control unit 24 corresponds to an "A/D activation timing control unit" described in the claims; and the A/D activation timing control unit 24 executing Step 110 in the routine illustrated in FIG. 3, corresponds to an "overlap determination unit" described in the claims.

Note that in the embodiment, the implementation assumes that the A/D activation timing control unit 24 determines whether a next peak timing of the reference signal "ref" overlaps with a control timing to execute the motor control process for the next time, by comparing the first time Ta (=Tf_i−τ) with the second time Tb (=Tref−Tr_i) to identify the longer and the shorter. However, the present disclosure is not limited to that, but parameters other than the first and second times Ta and Tb may be used for the determination as long as it is possible to determine whether the next peak timing of the reference signal "ref" overlaps with the control timing to execute the motor control process for the next time.

Furthermore, in the embodiment, although the motor control apparatus 10 is assumed to be used for controlling the motor 12 installed in a vehicle, the present disclosure is not limited to that, but may be used for a motor installed in an apparatus other than a vehicle.

The invention claimed is:

1. A motor control apparatus comprising:
   a reference signal generation circuit configured to generate a reference signal having a prescribed cyclic waveform;
   a resolver configured to output a position signal depending on a rotation angle of a motor rotating due to AC power supplied following a switching command for an inverter, based on the reference signal;
   a Resolver-Digital (R/D) converter configured to calculate the rotation angle of the motor, based on the position signal output by the resolver;
   an Analog-to-Digital (A/D) converter configured to apply an A/D conversion to a current signal flowing in the motor during a feedback cycle, the current signal varying depending on the rotational speed of the motor, and to apply an A/D conversion to the position signal at a peak timing when a peak of the reference signal is obtained; and
   a processor configured to:
      (i) calculate a command value to control the motor, and calculate the feedback cycle, based on the current signal to which the A/D conversion has been applied and the rotation angle of the motor calculated by the R/D converter;
      (ii) detect a fault of the R/D converter, based on a comparison between the rotation angle of the motor calculated by the R/D converter, and the rotation angle of the motor calculated based on the position signal to which the A/D conversion has been applied; and
      (iii) permit the A/D converter to apply the A/D conversion to the position signal at the peak timing when (a) a first time obtained by subtracting (a1) a process time required for a control process of the motor from (a2) the feedback cycle, is longer than (b) a second time having passed between (b1) a control end timing when the control process has ended and (b2) the peak timing; or inhibit the A/D converter from applying the A/D conversion to the position signal at the peak timing when the first time is not longer than the second time.

2. The motor control apparatus as claimed in claim 1, wherein the processor executes the fault detection of the R/D converter when the A/D conversion of the position signal by the A/D converter at the peak timing is permitted, and the processor does not execute the fault detection of the R/D converter when the A/D conversion of the position signal by the A/D converter at the peak timing is inhibited.

\* \* \* \* \*